Figure 1:
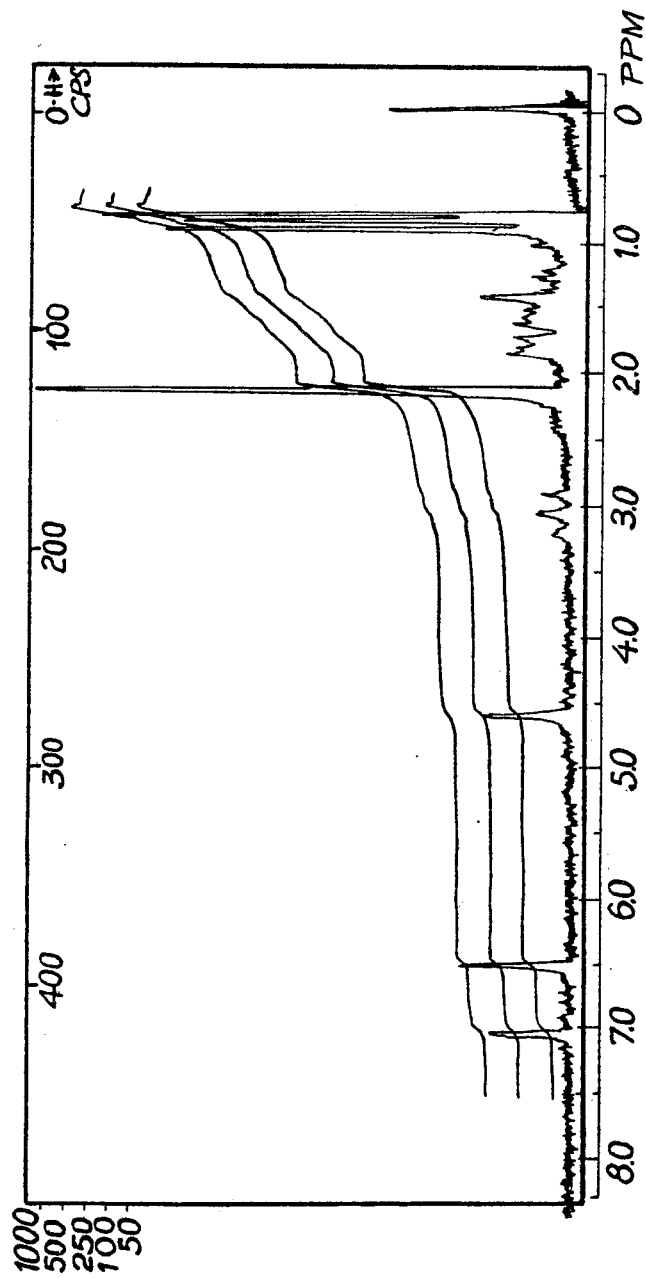

United States Patent [19]
Gazave

[11] 3,878,254
[45] Apr. 15, 1975

[54] 6-ISOFORMYL-3,4-XYLENOL AND A PROCESS FOR ITS PREPARATION

[75] Inventor: Jean Maurice Gazave, Paris, France

[73] Assignee: Marpha Société à Responsibilité Limitée dite Société d'Etude et d'Exploitation de Marques, Paris, France

[22] Filed: Mar. 11, 1970

[21] Appl. No.: 18,005

Related U.S. Application Data

[63] Continuation of Ser. No. 678,429, Oct. 26, 1967, abandoned, which is a continuation-in-part of Ser. No. 326,215, Nov. 26, 1963, abandoned.

[30] Foreign Application Priority Data
Nov. 28, 1962 United Kingdom............... 45036/62

[52] U.S. Cl.............................. 260/619 D; 424/346
[51] Int. Cl....................... C07c 39/12; C07c 37/00
[58] Field of Search................................ 260/619 D

[56] References Cited
UNITED STATES PATENTS
2,537,636  1/1951  Kitchen........................... 260/619 D
3,180,850  4/1965  Van Schooten ................ 260/619 D OTHER PUBLICATIONS
Kirk et al., "Encyclopedia of Chem. Tech.," 2nd Ed., Vol. 5, Chromatography, (1963).
Erman, "Jour. Am. Chem. Soc.," Vol. 86, pp. 2887–2897, (1964).
Beilstein, "Organische Chemie," Vol. 6, 3rd. Supplement, Sys. Nr. 53, p. 2780, (1948).

*Primary Examiner*—Leon Zitver
*Assistant Examiner*—Norman Morgenstern
*Attorney, Agent, or Firm*—Weiser, Stapler & Spivak

[57] ABSTRACT

Method of obtaining 6-isobornyl-3,4-xylenol and/or 6-exo-isocamphanyl-3,4-xylenol wherein 3,4-xylenol is reacted with camphene at a temperature between 70° and 80°C in the presence of a stannic chloride as a catalyst. The reacted mass is removed, cooled and a mixture of benzene and water is added. The water layer is removed and the benzene first washed with potash and then by water until neutral. The benzene is then driven off and the mass distilled with the fraction which passes between 203° and 223°C at 200 mm Hg. collected and recrystallized in petroleum ether. The compounds: 6-isobornyl-3,4-xylenol and 6-exo-isocamphanyl-3,4-xylenol. A method for separation of the mixture of these compounds by chromotography in an alumina column. Said compounds are useful as bacteriostatic agents.

3 Claims, 2 Drawing Figures

6-ISOFORMYL-3,4-XYLENOL AND A PROCESS FOR ITS PREPARATION

This application is a continuation of application Ser. No. 678,429, filed Oct. 26, 1967, which is a continuation-in-part of application Ser. No. 326,215, filed Nov. 26, 1963, both now abandoned.

This invention relates to substituted phenols for therapeutic treatment obtained by the action of camphene on 3,4-xylenol and in particular for obtaining 6-isobornyl-3,4-xylenol and/or its isomer 6-exo-isocamphanyl-3,4-xylenol.

These newly isolated compounds have particularly interesting therapeutic properties and the present invention has for an object the therapeutic application of these compounds as bacteriostatic agents.

According to one feature of the invention the aforesaid 6-isobornyl-3,4-xylenol and/or 6-exo-isocamphanyl-3,4-xylenol is prepared by reacting 3,4-xylenol with camphene in the presence of a catalyst stannic chloride, at a temperature of between 70° and 80°C. The reacted mass is then cooled and a mixture of benzene and water added. The water layer is removed and the benzene layer is first washed with potassium hydroxide and then by water until neutral. The benzene is driven off and the mass is distilled. The fraction which passes between 203° and 223°C at 200 mm.Hg. is collected and recrystalized in petroleum ether for obtaining a mixture of 6-isobornyl-3,4-xylenol and 6-exo-isocamphanyl-3,4-xylenol. If it is desired, the crystalized product is then redisolved in hexane and the 6-isobornyl-3,4-xylenol is separated from the 6-exo-isocamphanyl-3,4-xylenol by chromatography in a column packed with alumina employing benzene as an eluent.

Given below is a non-limitative Example of a method of preparing the compositions in accordance with the invention.

EXAMPLE 100 g. of 3,4-xylenol and 150 g. of camphene are melted in a flask having two necks and equipped with a reflux condenser and a thermometer. 10 g. of stannic chloride are added in small quantities; the temperature is kept between 70° and 80°C. for 4 hours. The mass is then allowed to cool and 300 cc. of benzene and 300 cc. of water are added. The aqueous layer is decanted, and the supernatant organic layer is washed, first with 1200 cc. of 10% potassium hydroxide and then with water until neutral. The benzene is driven off and the mass is distilled. The fraction which passes between 203° and 223°C./200 mm.Hg is collected and recrystallized in petroleum ether.

100 mg. of the product derived from the proceeding recrystillation is dissolved in 10 ml. of hexane.

This solution is then slowly passed through a chromatographic alumina column 20 cm in length and 16 mm in diameter containing 20 g of alumina (Prolabo ref. 20.995).

The column is then eluted with benzene which is collected in fractions of 2 ml. after the product appears in the eluent. The presence of the product is determined by the color of the collected eluent after adding:
— I drop of 2% iron perchloride solution
— II drops of 5% potassium ferricyanide solution.

18 ml. of a first fraction are collected then 2 ml. are eliminated and a second fraction of 20 ml. is collected. After distillation of the solvent the first fraction leaves a product having a melting point of between 94° – 96°C and the second fraction leaves a -of which the melting point is between 86°– 88°C.

The product of the first fraction is 6-isobornyl-3,4-xylenol while the product of the second fraction is its isomer 6-exo-isocamphanyl-3,4-xylenol.

These new compounds are defined by the following characteristics:

1. Melting point:
   6-isobornyl-3,4-xylenol: 94° – 96°C
   6-exo-isocamphanyl-3,4-xylenol: 86° – 88°C 2. Gas chromatography:
   Perkin-Elmer F 20 apparatus
   Apiezon column M
   Column temperature 240°C
   Nitrogen gas vector 40 ml./mn.
   Solution in $CHCl_3$
   Retention time:
      6-isobornyl-3,4-xylenol: 10 mn. 42 seconds
      6-exo-isocamphanyl-3,4-xylenol: 12 mn. 85 seconds 3. Thin layer chromatography:
   on a silica gel of 250 microns
   activated 30 mn. at 120°C
   migration liquid benzene
   temperature: 22°C
   Rf
   6-isobornyl-3,4-xylenol: 0.68
   6-exo-isocamphanyl-3,4-xylenol: 0.55

4. Nuclear magnetic resonance spectrum

The NMR spectrum of the compositions in solution in the deuteriochloroform were measured on a Varian A-60 apparatus and the chemical displacements, evaluated in $\delta$ units, are expressed in ppm from the tetramethylsilane signal taken as zero reference.

6-isobornyl-3,4-xylenol (see FIG. 1, below)

At 7.03 and 6.51 ppm, 2 singlets corresponding to 2 aromatic H, situated in para.

At 4.60 ppm, signal of a hydroxylic H exchangeable for the deuterium.

At 3.08 ppm, triplet corresponding to benzylic H situated in position 2 of the isobornane cycle; it is due to the coupling, by an identical constant (J = 8.5 cps), with two other protons.

At 2.15 ppm, unique peak due to the aromatic methyl groups.

Between 1 and 1.90 ppm, alicyclic hydrogens.

Between 0.78 and 1.05 ppm, 3 tertiary methyl groups.

This NMR spectrum corresponds with the following spatial structure of 6-isobornyl-3,4-xylenol:

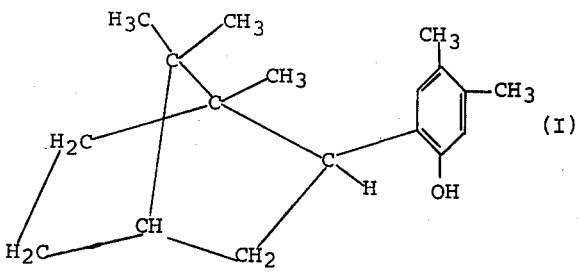

Figure 2:
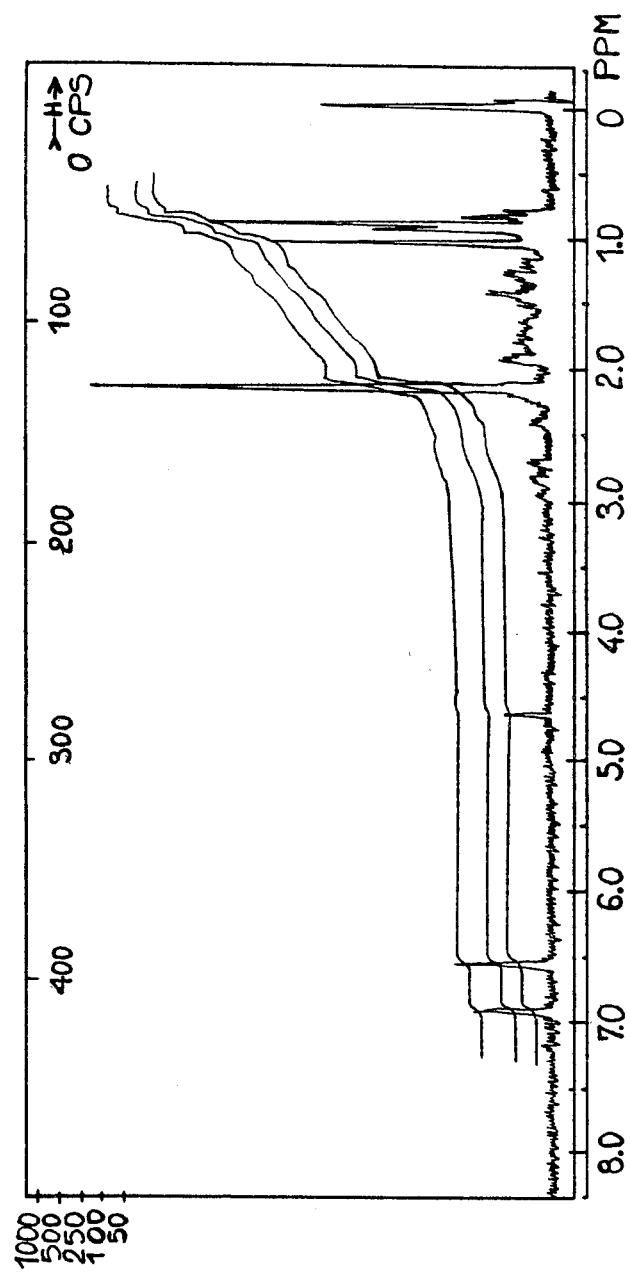

6-exo-isocamphanyl-3,4-xylenol (FIG. 2)
At 6.90 and 6.55 ppm, aromatic H situated in para.
At 4.60 ppm, phenolic H.

At 2.83 ppm, figure which appears to be a triplet due to a benzylic H coupled by an identical constant (J = 7,5cps) with two other protons and with a constant almost equal to zero, to one other proton.

Between 1.10 and 1.90 ppm, alicyclic H.

At 1.05 and 0.91 ppm, 2 tertiary methyl groups.

At 0.90 ppm, a doublet (J = 6,5 cps) due to a secondary methyl group.

This NMR spectrum corresponds with the following spatial structure of 6-exo-isocamphanyl-3,4-xylenol:

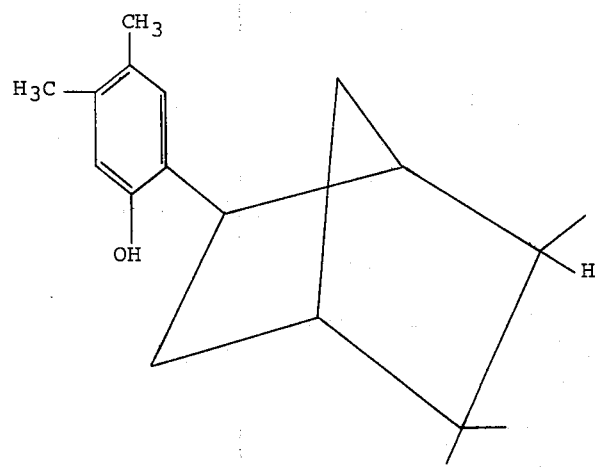

The obtaining of the isomeric mixture can be seen very clearly if one pictures the anchimeric form III of the intermediary carbo-cation.

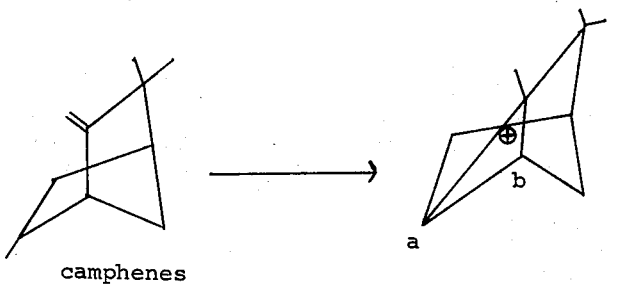

camphenes

Nucleophilic reaction on the center a → II
Nucleophilic reaction on the center b → I The bacteriostatic activities of the new compounds of this invention has been determined as follows:

1. The bacteriostatic action of 6-isobornyl-3,4-xylenol was determined by the "microbe stylus" technique.

This technique consists in preparing increasing dilutions of the compound to be tested in special agar, cast in Petri dishes. These agars are seeded in parallel streaks by different microbes.

These different microbes were preliminarily seeded on sloped agars having the following composition:

| Muscular tissue | 500 g. |
|---|---|
| Peptone | 10 g. |
| Na Cl | 5 g. |
| Agar | 15 g. |
| Water | 1 000 cm³ |

The agar tubes were placed in an oven at 37°C. for 24 hours and were then kept on ice.

By means of a platinum loop, colonies of bacteria were removed from the sloped media and were seeded on nutrient broths of the following composition:

| Muscular tissue | 500 g. |
|---|---|
| Peptone | 10 g. |
| NaCl | 5 g. |
| Water | 1 000 cm³ |

After 24 hours in an oven at 37°C., the broths consist of seeding media.

In addition, stock solutions containing 20 mg./cm³ of the compound to be tested are prepared, the solvent being ethylene glycol. By successive dilutions, it is possible to obtain concentrations of 10 mg./cm³, 5 mg./cm³ etc.

Agars known as "for antibiotics" are then prepared in Petri dishes. They have the composition:

| Liebig meat extract | 1.5 g. |
|---|---|
| Yeast autolysate | 3 g. |
| Peptone | 6 g. |
| Sodium chloride | 5 g. |
| Water | 1 litre |
| Agar | 15 g. |
| Disodium phosphate | 9.3 g. |
| Monopotassium phosphate | 0.7 g. |
| Pure Glucose | 2 g. |

The final pH is adjusted to 7.4.

These agars are liquefied by warming on a water bath at a temperature in the region of 50°C. They are mixed with the previously prepared solutions of the compound under test using 28.5 cm³ of agar and 1.5 cm³ of the solution.

After homogenisation the mixtures are poured into sterile Petri dishes. A series of agars cast in Petri dishes, containing different dilutions of the compound to be tested, is thus obtained. After they have solidified, they are dried for 1 hour in an oven at 37°C.

Sterile Pasteur pipettes are drawn out very finely and bent over at their ends. They are then filled by capillary action with the nutrient broth in which the microorganism under test has been cultivated.

The seeding on the agar is effected by parallel streaks produced by the pipettes containing the nutrient broths of the different bacteria. For each dish, a series of parallel streaks corresponding to each bacterium is obtained in this way. The Petri dishes are then placed for 24 hours in an oven at 37°C.

After this period, readings are made. If the product is active at a given dilution on a given microbe, there is no growth on the corresponding streak. If it is not, colonies grow all along the streak.

The following Table shows the results which were obtained for the different microbes mentioned above, giving the minimum concentration corresponding to inhibition of growth.

| MICROBES | Inhibiting rate in gamma/cm³ |
|---|---|
| Klebsiella aerobacter strain 45 | 62.5 |
| Staphylococcus London strain | 1.95 |
| Staphylococcus aureus strain 133 | 1.95 |
| Streptococcus aristene strain C10 | 3.90 |
| Enterococcus Deval strain | 3.90 |
| Streptococcus foecalis | 3.90 |

The isomer 6-exo-isocamphanyl-3,4-xylenol has a bacteriostatic activity of half that of 6-isobornyl-3,4-xylenol.

2. Anti-bacterial activity of the new compounds in vivo on mice.

A diluted culture in pneumococcus broth was injected intraperitoneally into albino mice, the activity of the said culture being such as to cause the death of 100% of the animals of one batch, and the dose of the products investigated was found which partially or completely prevents the deaths when injected by the same route, immediately afterwards.

Albino mice having an average weight of 20 g. of strain RAP were used. Diplococcus pneumoniae (Til) was used as a culture inascitic broth, 24 hours old. This bacterium is practically the only one which gives reliable and reproducible results. The culture was diluted with isotonic saline until bacterial concentrations (as determined by opacimetric comparison with known concentrations of damp bacteria) corresponding to $10^{-5}$, were obtained. This corresponds to about 5000 lethal doses in 0.5 cm³.

0.5 cm³ of the diluted culture was injected intraperitoneally into the animals and immediately thereafter 0.5 cm³ of the suspension of the compound being investigated.

The animals on which the tests were carried out were divided into batches of ten; a control batch receives nothing; five batches received increasing quantities of the compound investigated; the doses administered has been estimated in preliminary tests so as to include the minimum dose giving complete protection to the animals and the maximum dose giving no protection. The minimum dose of the new compounds protecting 50% of the animals was found to be 110 mg./kg injected intraperitoneally.

3. Toxicities of the new compounds.

6-isobornyl-3,4-xylenol : $DL_{50}$ = 1200 mg/kg for intraperitoneal injection into rats of the Wistar strain.

6-exo-isocamphanyl-3,4-xylenol : $DL_{50}$ = 800 mg/kg for intraperitoneally injection into rats of the Wistar strain.

By comparison, the toxicity $DL_{50}$ of the product known as 6-isobornyl-2,4-xylenol is 650 mg/kg for intraperitoneal injection in rats of the Wistar strain; but the retarded toxity of this composition does not permit its employment as a therapeutic to be envisaged.

In effect, when using the new compound of this invention, the mortality of the tested mice is stabilized at the end of 24 hours; on the contrary, with the composition known as 6-isobornyl-2,4-xylenol the mortality rate continuously mounted. An entire test batch of five animals died in 72 hours from a dose of 900 mg/kg, in 24 hours from a dose of 1500 mg/kg and in 12 hours from a dose of 2000 mg/kg.

4. Antiseptic activity of the new compounds.

It was determined on tests of different microbes :

at what concentration the composition killed the microbes, the time of contact between the compound and the bacteria necessary to kill the bacteria.

These results were compared with those obtained with phenol and a relationship was established between the minimum effective concentration of the compound studied and the minimum effective concentration of the phenol.

The cultures used for seeding were formed in a broth over a period of 24 hours.

In the experiment 10 drops of this culture were added to a tube containing 10 cm³ of nutrient broth and 1 cm³ of a 10% phenol solution; the concentration of the phenol was thus 1/110.

A drop of the seeded phenol broth is then placed in a tube of sterile nutrient broth, at the end of a determined time, which varies from one tube to another but lies between 2.5 to 15 minutes. These tubes are then placed in an oven at 37°C for 24 hours. The times and the concentrations are noted if there is a growth.

For each of the studied microbes the antiseptic strength of the phenol solution at a dilution of 1/110 is determined and the time necessary to kill the microorganisms recorded and thus the antiseptic power of the composition of the of the invention can be determined: greatest dilution and least time. The phenol coefficient is the ratio between the least concentration showing an antiseptic effect and 110.

The following tables show, for different microorganisms, the minimum effective concentration, the lest time at which this dilution is effective, the antiseptic strength, and the phenol coefficient.

| London strain, Staphylococcus | | | | |
|---|---|---|---|---|
| + indicates growth − indicates no growth | | | | |
| Time of contact, minutes | 2.5 | 5 | 10 | 15 |
| Phenol at 1/110 | + | + | − | − |
| New compounds: | | | | |
| at 1/100 | − | − | − | − |
| at 1/10 000 | − | − | − | − |
| at 1/100 000 | − | − | − | − |
| at 1/1 000 000 | + | + | + | + |
| at 1/5 000 000 | + | + | + | + |

The phenol coefficient is thus 1000.

Streptocoque Foecalis

The results obtained are shown in the following table:

| Time of contact, minutes | 2.5 | 5 | 10 | 15 |
|---|---|---|---|---|
| Phenol at 1/110 | + | + | + | + |
| New compounds: | | | | |
| at 1/1 000 | − | − | − | − |
| at 1/10 000 | − | − | − | − |
| at 1/50 000 | + | + | + | − |
| at 1/100 000 | + | + | + | + |

The phenol coefficient is 500.
Enterocoque, Deval strain

| Time of contact, minutes | 2.5 | 5 | 10 | 15 |
|---|---|---|---|---|
| Phenol at 1/110 | + | + | + | + |
| New compounds: | | | | |
| at 1/100 | − | − | − | − |
| at 1/1 000 | − | − | − | − |
| at 1/5 000 | − | − | − | − |
| at 1/10 000 | + | + | + | + |
| at 1/100 000 | + | + | + | + |

The compounds of the invention are thus useful for the treatment of infections caused by the pyogenic microorganisms whatever their location (skin, interstitial tissue, lungs, ears, nose or throat).

Pharmaceutical compositions in accordance with the invention may be for example, appear in the following forms: skin ointments containing 1 to 10% of the active substance:

ointments with a percutaneous action (containing 1 to 10% of active substance) in association with a penetrating agent such as eucalyptol; suppositories for the treatment of pneumopathies (also containing eucalyptol); alcoholic solutions (1 to 5%) for disinfecting the skin during surgery, suspensions for atomisation into the nose or throat (1 to 5%); ear drops (1 to 5%) for acute or catarrhal otitis; suspensions which can be injected intramuscularly or subcutaneously (the compound is solubilised in transesterified olive oil, which is suspended in 5 parts of isotonic saline (1 to 2%); and tablets.

A number of clinical tests have been carried out on ordinary pneumopathies, angins, intestinal infections, and cutaneous pyogenic infections. The following types of pharmaceutical preparation were used:

suppositories based on cocoa butter weighing 2 g. for adults and 1 g. for children, and containing 6% of the compound of the invention and 3% of eucalyptol to facilitate rapid passage through the rectal mucous membranes; capsules containing 0.05 g. of the compound of the invention; ointment based on the Lanette wax of the French Pharmaceutical Codex, and containing 5% of the compound of the invention and 3% of eucalyptol.

Forty patients (20 adults and 20 children of 1 to 5 years) were treated for ordinary pneumopathies by administration of one suppository every six hours. The pulmonary affection treated were seasonable affections or acute infections of young children or old people. In every case, except two caused by viruses, a cure was obtained in 48 hours with good tolerance of the suppositories.

The same treatment were used with 20 cases of ordinary angina (15 adults and 5 children). The results were very satisfactory and cures were obtained within 24 hours in 17 cases and within 18 hours in 3 cases. The tolerance was good.

Ten adults, suffering from ordinary summer diarrhoea, were treated with one capsule every 4 hours for 24 hours. The results were remarkable, as much for their rapidity (the cure was often obtained in less than 12 hours) as for their power. Again tolerance was excellent.

In such treatments the compounds of the invention can be associated with an anti-spadmodic, a B-group vitamin, or a lactic ferment.

Cutaneous pyogenic infections were treated with the ointment containing the compound of the invention in fifteen cases of infected open sores. Tolerance was good and the results excellent.

What is claimed is:

1. 6-isobornyl-3,4-xylenol.

2. Process for preparing 6-isobornyl-3,4-xylenol and/or 6-exo-isocamphanyl-3,4-xylenol, which comprises reacting 3,4-xylenol with camphene in the presence of stannic chloride as a catalyst, at a temperature between 70° and 80°C, extracting the resulting product and collecting the fraction distillable between 203° and 223°C/200 mm. Hg., crystallizing said fraction redissolving the crystallized product in a solvent and separating the 6-isobornyl-3,4-xylenol from the 6-exoisocamphanyl-3,4-xylenol by chromatography in an alumina column.

3. The process of claim 2 wherein the crystallized product is dissolved in hexane and benzene is used as the eluent in the alumina column.

* * * * *